Nov. 23, 1965        G. O. CONNER        3,219,390
APPARATUS FOR PULVERIZING SOLID MATERIALS
Filed July 15, 1963                     7 Sheets-Sheet 2

INVENTOR.
GUY O. CONNER
BY
J. L. Douglass
HIS ATTORNEY

INVENTOR.
GUY O. CONNER
BY
J. O. Douglas
HIS ATTORNEY

Nov. 23, 1965

G. O. CONNER 3,219,390

APPARATUS FOR PULVERIZING SOLID MATERIALS

Filed July 15, 1963

INVENTOR.
GUY O. CONNER

Nov. 23, 1965   G. O. CONNER   3,219,390
APPARATUS FOR PULVERIZING SOLID MATERIALS
Filed July 15, 1963   7 Sheets-Sheet 6

INVENTOR.
GUY O. CONNER

INVENTOR.
GUY O. CONNER

United States Patent Office 3,219,390
Patented Nov. 23, 1965

3,219,390
APPARATUS FOR PULVERIZING SOLID MATERIALS
Guy O. Conner, 1118 Mt. Vernon Blvd., Cleveland Heights, Ohio
Filed July 15, 1963, Ser. No. 295,162
12 Claims. (Cl. 299—85)

This invention relates to a new and novel apparatus for use in breaking or pulverizing hard materials formed of discrete particles such as for example mineral bearing solids found in a natural or deposited state.

This is a continuation-in-part application of my application entitled "Mining Machine Having a Rotating Breaker Head," Serial No. 698,107, filed on November 22, 1957, now abandoned.

Heretofore various machines have been proposed for mining operations, however there have been certain common disadvantages in the operational concepts thereof that are inherent in their construction. As an example, prior mining devices have frequently comprised a digging type of cutter or tool. This usually involved the use of cutter bits or blades which operate by virtue of a picking action wherein the cutters strike the material with hard blows, which are accompanied by a digging action. The result is that regardless of the type of material being worked upon, an abrading action takes place between the cutters and said material with consequent breaking of the material and frequent replacement and/or sharpening of the cutters required, the frequency thereof depending largely upon the type of material being worked.

Certain types of materials are so hard that these devices have been found to be wholly inadequate for removing the material and the only recourse is by drilling and blasting. This is time consuming and dangerous.

By the present apparatus, I am able to break up the hardest of known materials which occur in the natural state as well as nearly all types of commercial aggregates such as concrete, as well as the bituminous materials.

Further, the concepts of the present invention are such that the life of the breaking tools utilized therein may be greatly extended, and in addition said tools may be made of materials ordinarily not considered as useful for such purposes. Furthermore, when the tools do wear they may be easily sharpened by unskilled labor and the sharpening, although reducing the size of the tool, does not detract from its original operation for the construction is such that the reduction in size still enables the original mode of operation to be continued.

This I am able to accomplish by providing a novel material pulverizing apparatus which incorporates the concepts of generating and directing pulverizing forces against the material in such manner that substantially only compressive forces are applied to said material which are effective to overcome the forces binding the discrete particles of the material together thus breaking particles therefrom and hence pulverizing said material into predetermined particle size, said compressive forces being thus applied in such manner that substantially no abrasion or lateral forces are evident between the tools which apply said forces and said material being worked upon.

It is therefore a primary object of the present invention to provide a novel and new apparatus for pulverizing solid materials formed of discrete particle wherein said apparatus is operable to generate a pulverizing force of greater magnitude than the forces holding the particles of said material together, and applying said pulverizing force substantially compressively against said material effective to break off discrete particles therefrom.

Another object of the present invention is to provide a new apparatus for pulverizing solid materials formed of discrete particles as defined in the last preceding paragraph and further characterized by applying the forces to the material in a predetermined pattern so as to pulverize the same into predetermined size.

Another object of the present invention is to provide new and novel apparatus for pulverizing solid materials formed of discrete particles and wherein said apparatus includes means for providing a pulverizing force of greater magnitude than the forces holding the particles of said material together, means for applying said force compressively against said material in such manner as to break the same into predetermined particle size without any lateral or abrading forces acting against said material and force applying means.

Still other objects and advantages of the invention and the invention itself will become more apparent from the following disclosure which is illustrated by the accompanying drawings wherein.

Briefly, the novel apparatus of the present invention is especially designed to pulverize solid materials formed of discrete particles by first providing a pulverizing force of a resultant magnitude that is greater than the forces binding the particles together, and secondly, by applying the pulverizing force to said material in a predetermined substantially compressive pattern effective to break said material into particles of preselected size.

As merely one form of apparatus I have herein disclosed mobile mining apparatus which includes a mobile support which may be a tractor or a barge having thereon a frame which supports a tiltable subframe. The subframe is provided with ways which, in turn, support an extensible slide or boom. The boom carries the material breaker device or head on its end for easy manipulation and presentation to the material to be worked upon.

The breaker device itself is novel in that it includes a head which is revolvable and which supports a plurality of breaker members which partake of a revolving movement of their own. The head may be moved to different positions to break up the materials on the floor, side walls, roof and/or the end wall.

More particularly in the embodiment shown, the mobile tractor support includes the usual endless tracks 10 driven by any suitable means, not shown but which is well known in the art. The tracks support a frame, which includes longitudinally extending members 11. These members in turn support a box-shaped housing including side walls 12 and a top platform 14.

Upon the top 14 there is provided a motor 15 having a shaft with a worm 16 in mesh with a worm gear 17 that is carried on a shaft 18 journalled in bearings 19 spaced from the opposite sides of the housing. The shaft 18 carries bevel gears 20 which are in driving engagement with bevel gears 21 carried upon the upper end of screw threaded shafts 22. The shafts 22, which are elevation shafts, are in threaded engagement with supports or frame members 24 that are part of a main frame which is movable vertically within the housing. Two pairs of the shafts are provided, one pair being in front and the other in the rear.

Rearwardly extending shafts 30 are provided on each side being journalled in bearings 31 and having beveled gears 32 on each end which are in mesh with the gear 21 of the rear screws 22.

The bottom ends of the shafts bear upon the tops of the frames 11 being journalled in suitable anti-friction means indicated at 26. These bearings may be flanges 27 which rest on top of the frames 11 with studs 28 extending in and revolvable in apertures in the frame.

It will be apparent that upon energization of the motor 15 all four of the screws are rotated and are of the proper pitch to cause the main frame 24 which is comprised of longitudinally extending side members, extending from front to rear, to be elevated or lowered.

Between the main frame members, in close proximity thereto and coextensive therewith, is a subframe which includes oppositely disposed ways 40. The front ends of the ways are connected to the main frame by trunions 41. The rear of the subframe may be moved upwardly to tilt the entire subframe within the main frame.

Figure 1:
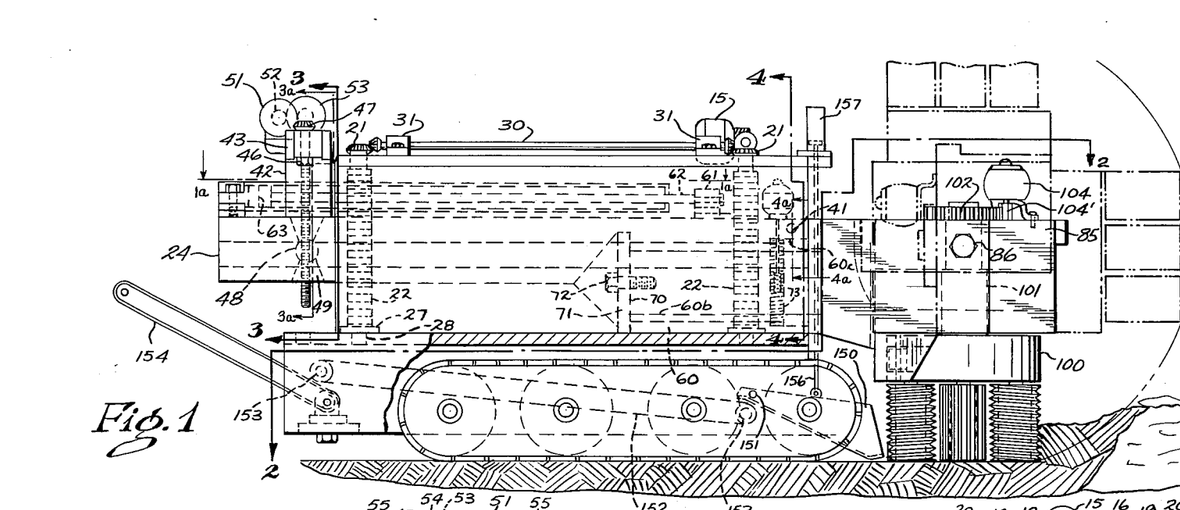
FIG. 1 is a side elevational view of a tractor mounted mining machine of my invention, with certain hidden parts indicated by dashed lines.
Figure 1A:
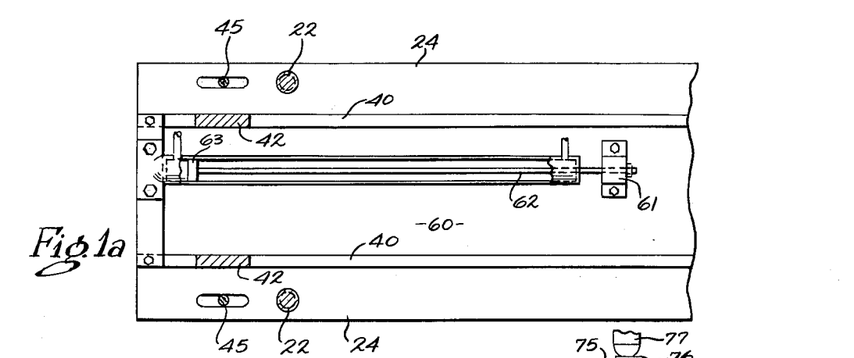
FIG. 1a is a fragmentary section taken on the line 1a—1a of FIG. 1.
Figure 3:
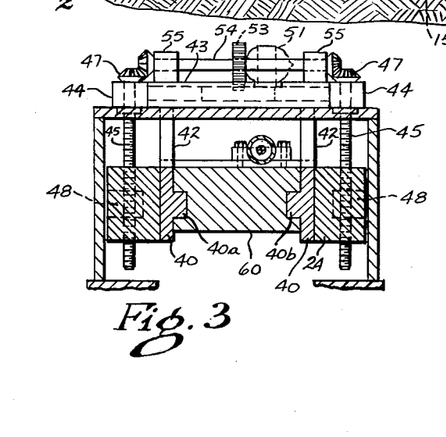
FIG. 3 is a section taken on the line 3—3 of FIG. 1.
Figure 3A:
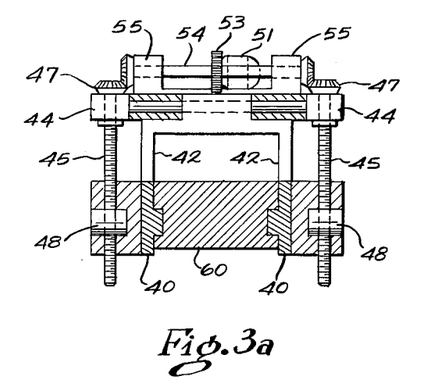
FIG. 3a is a section taken on the line 3a—3a of FIG. 1.

As best shown in FIGS. 1 and 3, the subframe has a pair of risers 42 which connect with a cross head beam 43, the ends of which are provided with bearings 44 that are swivably connected to the ends of the cross head and in which jack screws 45 are rotatably journalled. The jack screws rotate freely in the bearings, a thrust nut 46 engaging with the bottom of the bearing and a bevel pinion gear 47 engaging the top of the bearing. Trunions 48 are set into the beams 24 of the main frame, wedge shaped clearance openings 49 being provided through the top and bottom of the beam to allow lateral movement of the jack screws which are threaded through the trunions.

The jack screws are driven by a motor 51 through a reduction gearing 52–53 which is connected to a shaft 54 journalled in bearings 55 and having bevel gears on its ends in engagement with the gears 47.

When the motor 51 is energized, to rotate the jack screws, the subframe is tilted about the trunions 41. Between the ways 40, and supported on longitudinally extending ribs 40a is a slide 60, the slide being provided with longitudinally extending channels for the reception of the ribs on the ways. Thus, the slide may be moved longitudinally of the subframe to be projected beyond the end of the subframe.

It is thus apparent that the tractor or barge mounted main frame along with the subframe and slide may be lowered or elevated and that the subframe and slide may be tilted. As will later be more apparent this enables the machine to break material on a level or on a grade.

The breaker head is mounted on the end of the slide 60 in such a manner that it may be rotated to any position within a semispherical radius.

Figure 4:
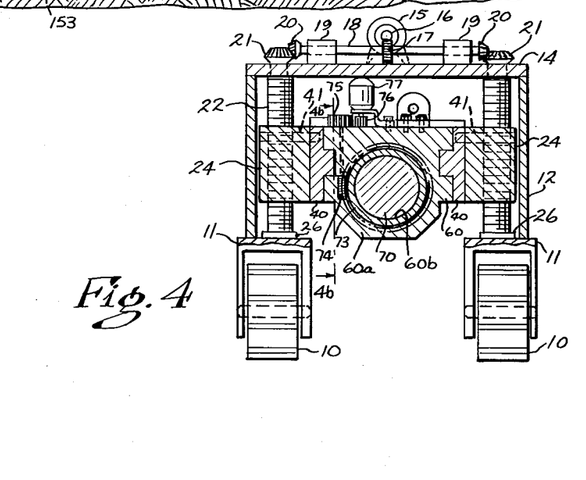
FIG. 4 is a section taken on the line 4—4 of FIG. 1.
Figure 4A:
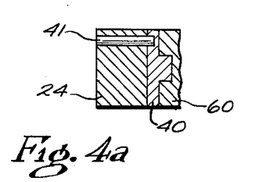
FIG. 4a is a fragmentary section taken from the line 4a—4a of FIG. 1.
Figure 4B:
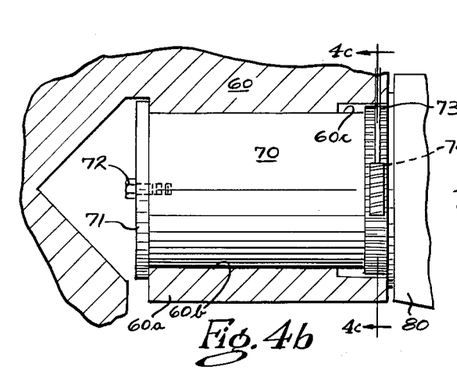
FIG. 4b is a section taken on the line 4b—4b of FIG. 4.
Figure 4C:
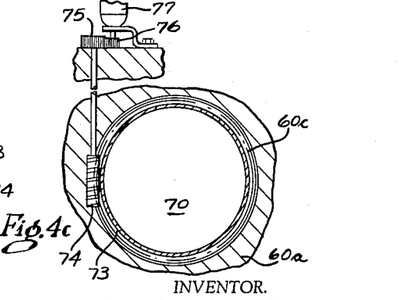
FIG. 4c is a section taken on the line 4c—4c of FIG. 4b.

As can best be seen in FIG. 4, the end of the slide 60 is provided with a boss 60a having a cylindrical bore 60b in which is rotatably mounted an enlarged trunion 70 that is held in place by a plate 71 engaging the end of the boss and a screw 72 extending into the trunion. The bore is enlarged at 60c to make room for a worm gear 73 attached to the trunnion which is engaged by a worm 74 driven by a shaft which extends upward through the slide and has a spur gear 75 on its upper end. The spur gear meshes with a smaller spur gear or a reduction gearing train 76 that is driven by a motor 77 carried by a bracket on top of the slide.

Thus, the head support is rotatable more than 180° about an axis defined by the trunion and extending normal to the axis of the main trunion 70. A drive for rotating the support includes a motor 87 having a worm 88 in mesh with a worm gear 89 on a shaft having a spur gear 90 in mesh with a gear 91 carried by the trunion 86.

The head support carries the breaker head and it, in turn, carries the breaker elements. In the drawings I have illustrated two breaker heads each of which has a set of breaker elements. It will be appreciated, however, that one such head may be used or that more than two may be used depending upon how wide a swath is to be cut out of the material.

In either event, each breaker head assembly includes a breaker head 100 carried on a spindle 101 extending vertically through the support 85 and having on its upper end a spur gear 102 in mesh with a drive pinion 103. The pinion 103 is driven by a gear 104' on the shaft of a motor 104, which is mounted in a bracket on top of the head support. As can be seen from FIG. 2, when two heads are used they may be driven by a single motor since the pinions 103 on each head may mesh with each other.

Each breaker head is provided with a plurality of vertically extending bores in each of which is disposed a shaft 105 having a spur gear 107 on its upper end and formed to provide a mandrel 109 on its lower end for supporting the breaker elements per se.

Each head is seen to carry four such shafts disposed with their axis in a circle coaxial with the spindle 101. As viewed in FIG. 5, the support 85 on the left side carries an internal gear 110, the teeth of which mesh with the spur gears 107. It will be apparent that as the spindle revolves, the head is revolved in one direction while the individual shafts 105 rotate in the opposite direction.

Figures 2, 5, 6, 7, 8, 9:
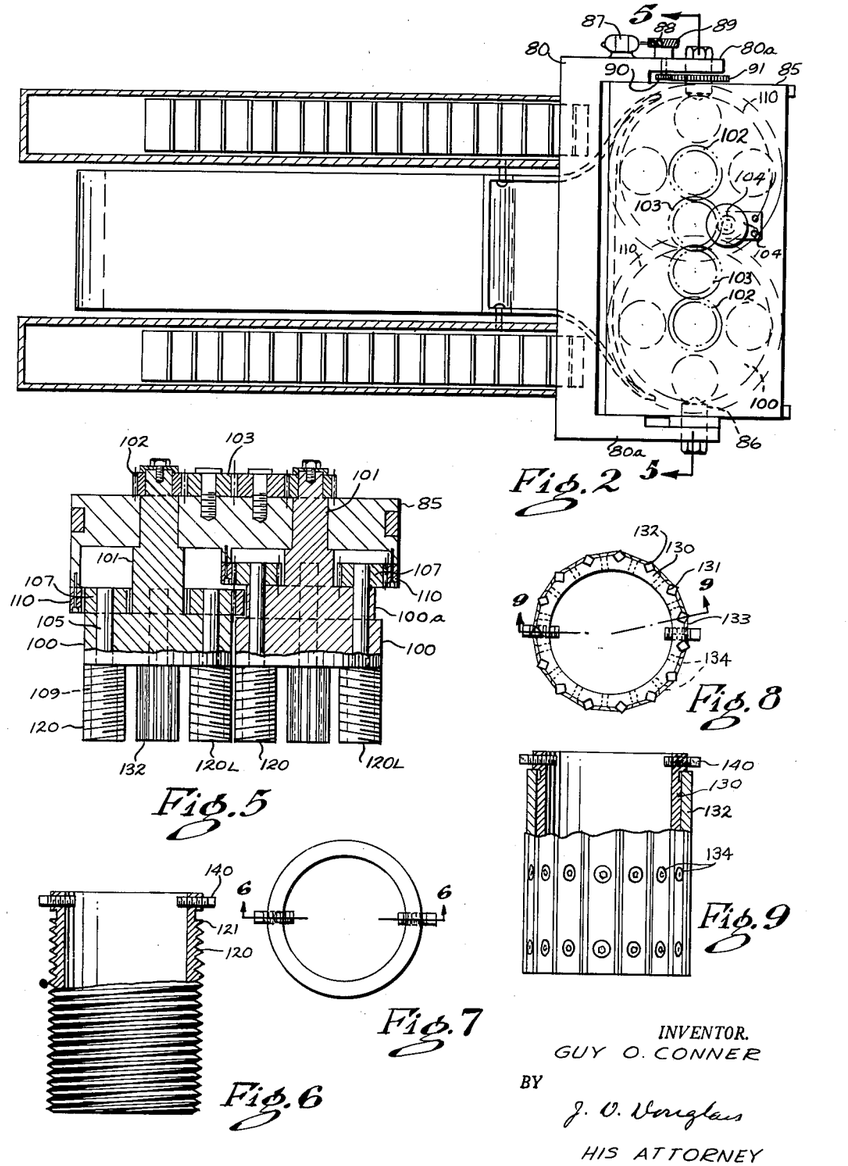
FIG. 2 is a view thereof taken on the lines 2—2 of FIG. 1.
FIG. 5 is a section taken on the line 5—5 of FIG. 2.
FIG. 6 is a view partly in elevation and partly in section of a breaker.
FIG. 7 is a top plan view thereof.
FIG. 8 is a top plan view of another type of breaker.
FIG. 9 is a view partly in elevation and partly in section of the breaker of FIG. 8.

When more than one head is used, as illustrated in FIG. 5, it is desirable that the heads be close to each other. In this instance the right-hand head has an intermediate extended part 100a which enables the spur gears 107 to be disposed above the corresponding gears on the left-hand side and in mesh with the internal gear 110 which is carried by the support 85 in a plane above the left-hand ring gear.

The connection of the heads by the drive gearing is such that the heads rotate in the same direction. It may, however, be desirable, in some instances, to have them rotate in opposite directions.

Although each of the breaker elements as used on one head may be identical, I contemplate several different types may also be used on one head. Several types of breaker elements are shown all of which involve the basic concept of the invention but each of which carry out the invention in a slightly different manner.

One type of breaker is illustrated in FIG. 6 and constitutes a sleeve 120, arranged to be secured on the mandrel 109 by means such as set screws 140. The periphery of the sleeve is provided with a helical land 121. This may be a single or double helix and the pitch and height of the land may be varied. The sides of the land may incline to provide a predetermined included angle, the one shown being substantially 60°. I contemplate an element such as shown in FIG. 6 where the breaker surface 120 is of right-hand thread and the surface of breaker 120L is of left-hand thread. In between the breakers 120 is another type 132, later described in detail, which has vertically extending breaker members. I also contemplate that breakers of the type shown in FIG. 5, wherein the lands are of straight circumferential character and not helices, may be used.

The breaker element having the longitudinally extending blades includes a sleeve 130 also secured to the mandrel 160 by set screws 140. The sleeve is provided with a series of longitudinally extending V-shaped grooves or seats 131, the sides of which subtend an angle of 90°. The grooves receive elongated breaker members 132 which may be of square cross section and which are held in place in the seats by keeper plates 133 that engage the sides of the bars which project beyond the sides of the grooves, by screws 134 threaded through the keeper plates into the sleeve 132.

It should be pointed out that the breaker heads may be made up of individual breaker elements of the types as shown where one type of element is alternated with that of the other or they may all be of the same type, depending upon the material to be broken. I have found that with the arrangement shown, the device operates very efficiently on extremely hard materials such as taconite ore. It should also be pointed out that the lands or the blades do not need to have sharp bank-engaging points and in many instances it is preferred that these points have a definite radius.

Having described a preferred embodiment of mining apparatus, the manner in which it functions to pulverize or disintegrate solid materials will now be described.

Figures 13, 18:
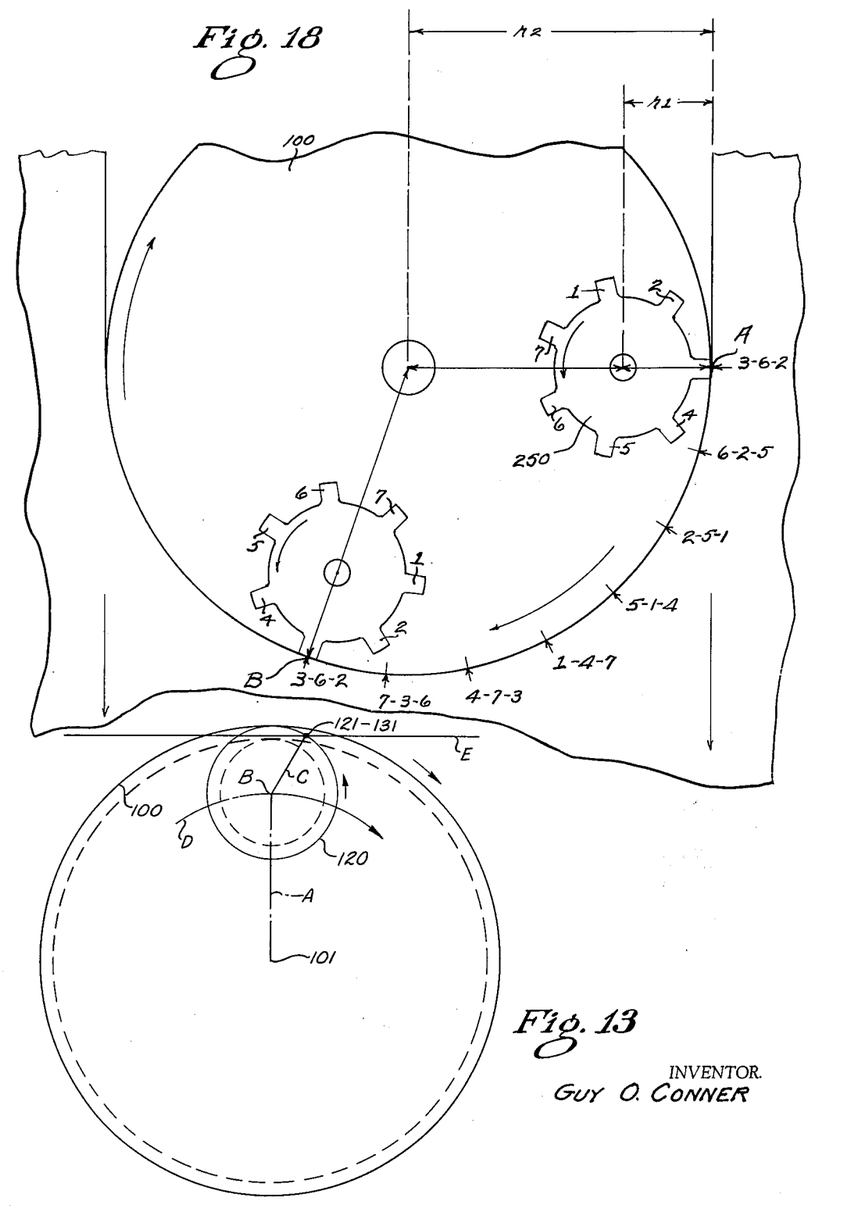
FIG. 13 is a diagram depicting the forces exerted by breaker elements.
FIG. 18 is a diagrammatic view which shows a particular program or pattern developed by the breaker element against the wall of the material.
Figure 14:
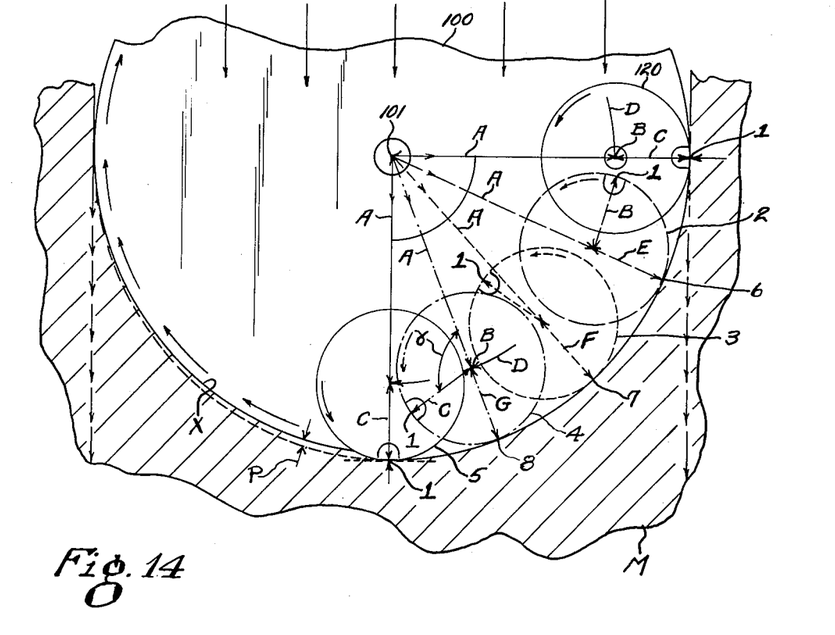
FIG. 14 is a diagram illustrating how the breaker element of the embodiment disclosed herein is advanced along the face of the solid material being worked upon to practice the pulverizing method of the present invention.

With reference directed particularly to FIGS. 13, 14 and 18, the breaker head 100 is rotated in one direction for example in a clockwise direction, and each of the breaker elements 120 is rotated in the opposite direction or in a counterclockwise direction as herein referred to.

The rotational speed of the head and each breaker element carried thereon are synchronized with each other so that any one breaker point on each of said breaker elements appears to be stationary with respect to the face or wall X of the material at the instant it is presented thereto so that it is pressed directly against said material face when advancing the head toward said wall of material with substantially no accompanying lateral or abrading forces acting therebetween.

This is accomplished by having the linear velocity of said point on the breaker element due to the rotation of the breaker element equal and opposite to the linear velocity of said point due to the rotation of the head 100.

With reference directed to FIG. 18, the linear velocity of a point such as point #1 on the breaker element is related to the angular velocity of the breaker element by the following equation:

$$V_1 = \omega r_1$$

where $\omega$ is the angular speed of the breaker element in radians per unit of time; and, $r_1$ is the distance between point #1 and the center of rotation of the breaker element.

The linear velocity of said point #1, as a result of the rotation of the head, is likewise related to the angular velocity of the head by the following equation:

$$V_2 = \omega r_2$$

where $\omega$ is the angular velocity of the head and $r_2$ is the distance between point #1 and the center of rotation of the head.

By setting $V_1$ equal to $V_2$ or $\omega r_1 = \omega r_2$ the linear velocity of any one point on the breaker element is seen to be related to the angular velocities of said breaker element and head and to the radial distance between said point and the center of rotation of the breaker element and head thereby providing an unlimited combination of dimensional relationships which may be selected for said element and head. Therefore, it will be apparent that if one breaker element has a different radius with respect to another breaker element, it must have a different angular velocity with respect to the latter in accordance with the above equation.

Each breaker element is forced into the material by a combined rolling and toggle-like action now to be described whereby only a compressive force is applied to said material which force acts radially outwardly from the center of the head, through the center of the breaker element and hence to the material face or wall whereby the material is broken off or pulverized into discrete particle size.

This rolling and toggle like action can best be visualized upon reference to FIG. 14 which is a diagrammatic view illustrating the same.

As herein seen, the center of the head 100 is identified at 101 whereas the center of the single breaker element 120 as illustrated is identified at B. As is also seen in FIG. 14, the centers 101 and B of the breaker head 100 and breaker element 120, respectively, are disposed in parallel spaced relation to each other and to the surface of wall X of the material M.

A linkage which acts somewhat like a toggle linkage for want of a better analogy is indicated by links A and C connects the center 101 of the head to the center B of the breaker element (link A) and from the center of the breaker element to a point on the periphery of said breaker element, for example point 1.

The center 101 of the head represents the fixed end of this toggle linkage, the center B represents the place where the working pressure or force D resulting from rotating the head 100 is applied to the toggle linkage, and which center B is the point between links A and C. As is understood, the working pressure D is obtained from the kinetic energy of the head 100 as a result of the rotation of said head.

The free end of the toggle linkage is the point 1 on the periphery of the breaker element.

Just prior to the instant when point 1 is moved into engagement with the face X of the material M, for example at the instant represented by position 4, the toggle linkages A and C are at an angle $\alpha$ with respect to each other and no working pressure is transmitted therealong.

Subsequently, at substantially the instant represented at position 5 as herein shown, the point 1 on the breaker element rolls into engagement with the face X and at this instant said point 1 appears to be stationary with respect to said face, and at the same instant the toggle linkage A and C is indicated as a straight line so that said point is in alignment with the center 101 of the head and the breaker element center B. Therefore, since the center 101 represents the fixed end of the toggle linkage and the point 1 on the breaker element 120 represents the free end of said linkage, the working pressure D is resolved at center B into substantially a compressive force working in a radial direction outwardly from the head center 101, which is applied by the breaker element under great compressive force directly into the material.

This is accomplished with substantially no consequent lateral or abrasion forces acting between the breaker element and the material M.

As a result, said compressive force is effective to crush or pulverize the material underlying said point 1 to an approximate depth as indicated at P.

It will now be apparent, that in the case where the outer surface of the breaker element is smooth or is of such contour as to be in continuous engagement with the surface X of the material a rolling and toggle action of the type referred to above is always transmitting a radially outwardly acting compressive force against the surface X of said material. For example, as shown at position 2 in FIG. 14, toggle linkage A and E transmits said compressive force through breaker element point 6 to the surface X of the material.

Likewise, at position 3 toggle linkage A and F transmits said force through breaker element point 7; at position 4 toggle linkage A plus G transmits said force through breaker element point 8, etc.

Figure 15:
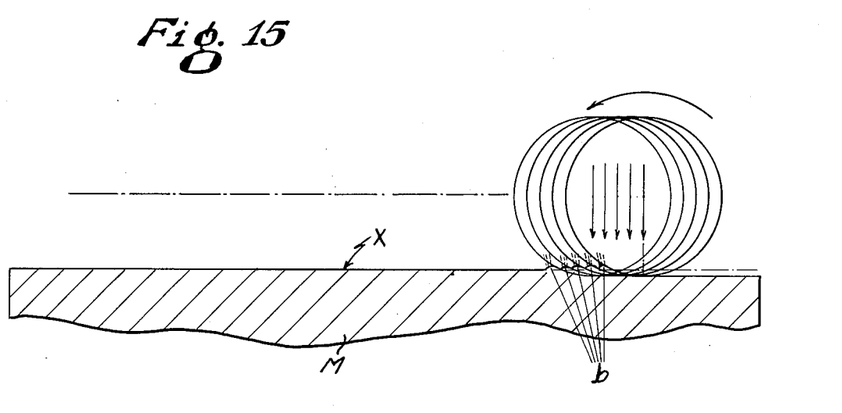
FIG. 15 is a diagram illustrating how a plurality of breaker elements each having a smooth exterior are carried on a breaker head and advanced along the face of the solid material.

FIG. 15 illustrates approximately what is happening to the surface X of the material M as a plurality of breaker elements is advanced therealong. In this illustration the surface has been made linear so as to give a somewhat more emphasized picture of what is occurring.

As is herein seen, one breaker element is pushed into the material so as to pulverize the same, the material ahead of said breaker element, as is indicated at $b$ tends to rise upwardly above the material surface X, and the next breaker element is carried on said head so that as it is rollably advanced from right to left this protuberance $b$ is broken off and pulverized by said element. This action is continuous inasmuch as the exterior surface is smooth or is rolled into continuous engagement with the face of the material being thus effective to continuously break up or pulverize said material to said illustrated depth.

Figure 16:
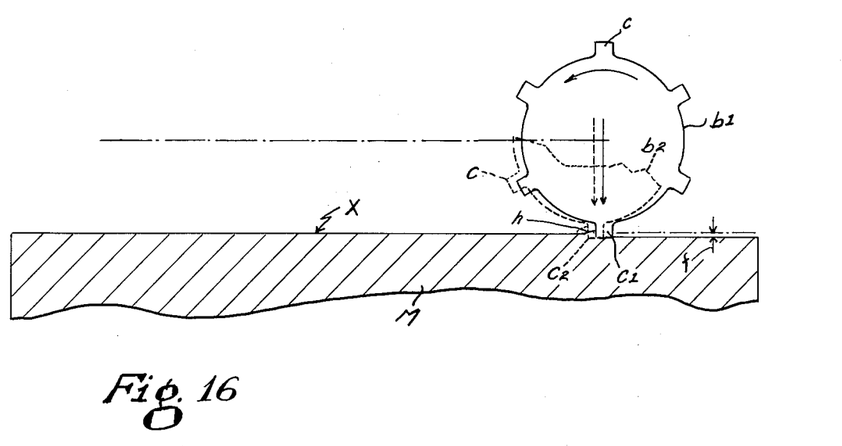
FIG. 16 is a view similar to FIG. 13 but with a breaker element having an exterior configuration formed of spaced wedges extending longitudinally therealong.

In FIG. 16 is diagrammatically illustrated what occurs when a plurality of breaker elements $b_1$, $b_2$, etc. are utilized, each having radially projecting, circumferentially spaced teeth or projections $c$ formed thereon.

At the instant breaker element $b_1$ is rolled so as to bring its breaker point $c_1$ into engagement with the material M it is pushed compressively into said material effective to pulverize the same underlying said point to the depth $f$ and the material ahead of said point $c_1$ tends to rise or bulge upwardly as is seen at $h$.

The breaker elements may be carried on their respective head so that the next breaker element $b_2$ is rolled into position so that its breaker point $c_2$ pushes directly against this raised protuberance $h$ so as to break off this portion and pulverize the same.

In like manner, the breaker elements may be arranged on the breaker head so that the breaker point $c_2$ pushes against the material slightly ahead of the protuberance $h$ to thus break a larger particle off the material face X, being thus effective to pulverize the same into somewhat of a larger particle size.

It will now be apparent that any desired particle size may be obtained by providing a corresponding configuration to the breaker elements carried on the breaker head 100 such as for example any of the various embodiments of breaker elements that are shown in FIGS. 6, 9, 11 and 12.

Further, it will be apparent that by mounting a preselected combination of breaker elements on any one breaker head 100, such for example the combination of breaker elements 120 and 132 as shown in FIG. 5, and by prearranging the rotational drive ratio between the head 100 and said breaker elements—remembering that at the instant any one breaker element moves into contact with the face of the material being pulverized it must appear to be stationary with respect to said material face, any desired pattern of application of compressive forces across said face may be obtained.

This is an important feature of the present invention inasmuch as certain materials may be most economically pulverized or broken into a particular particle size by the application of a predetermined pattern of compressive forces across the face of said material.

For example, in the case where the helical or thread type breaker elements are used, the pattern lines in this instance are diagonal parallel lines; however, if alternate right and left hand threads are used on said elements this would provide a crisscross pattern.

It will also be apparent that in this instance the size of the pulverizing pattern is determined by the pitch and number of the threads. If a small pattern is desired the pitch is decreased and the number of threads increased.

In the case of vertical breaker elements, the pulverizing action is somewhat different because the contact is along vertical lines.

Figure 10:
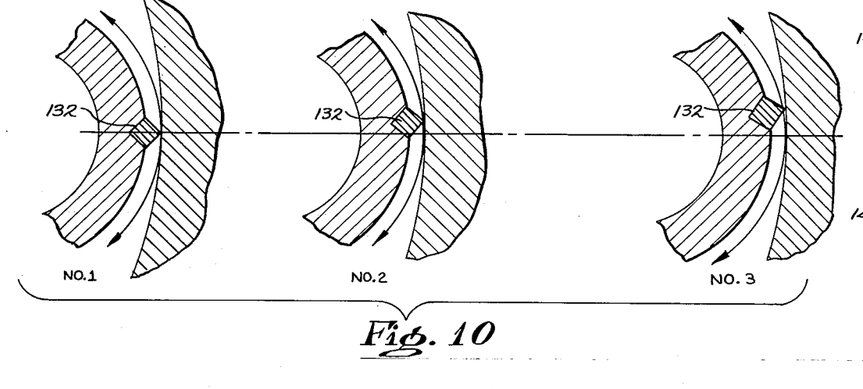
FIG. 10 is a diagrammatic view for illustrating the action of the breaker of FIG. 9.
Figure 10A:
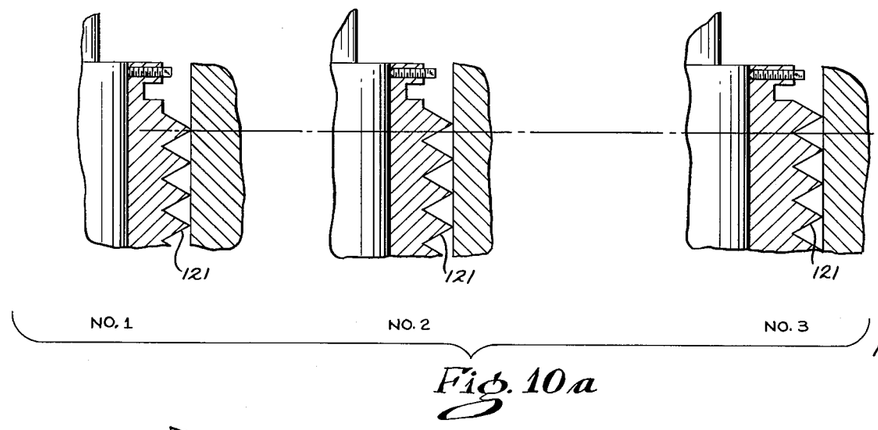
FIG. 10a is a similar view for illustrating the action of the breaker of FIG. 6.

This action is illustrated by the diagram of FIGS. 10 and 10$a$, which depicts the action of a six breaker head where three of the breaker elements have the helical lands and the three alternate breakers have vertical elements. In FIG. 10$a$, the bracketed figure shows the point of contact of the circumferential breaker land as each breaker land engages with the bank, the bank being shown in vertical section. It will be seen that the crest of the tooth on No. 1 helical breaker is at the dot dash line. That the No. 2 helical breaker has the corresponding tooth slightly above the line for No. 1 and that No. 3 is still higher. Thus, the points of contact can be made as close together as desired not only by increasing the number of threads but also by coordinating the placement of the breaker points on the respective breaker elements.

In the lower part of the figure, the effect attained by the vertical breakers is illustrated.

Here it will be seen that No. 1 vertical element engages the bank along the dot dash line, No. 2 is slightly to the left and No. 3 is still further to the left, the bank being shown in horizontal section.

Another important feature of the present invention is the ability to provide a predetermined program or pattern of application of a pulverizing force for a preselected configuration of breaker element. This is accomplished by preselecting the gear ratio between the ring gear 110 and spur gear 107 and the number of projections on the breaker element.

For example, as viewed in FIG. 18 a breaker element 250 is shown having seven radial breaker projections equally spaced about its periphery.

With this particular assembly at point A on the wall of the material, projection 3 is initially brought into engagement with said point A. At point B one revolution later for the breaker element projection 3 is again brought into engagement with said wall.

When the breaker element next approaches point A, projection 6 is moved into engagement with said point A, and for successive applications to said point A, a progression of 2, 5, 1, 4, 7 identifies the order or pattern in which the projections are moved into engagement with said point.

In like manner for point B on the wall of material, the breaker element projections for subsequent applications to said point B is in the order of or pattern 6, 2, 5, 14, 7.

As will now be realized for the intervening points of application of the projections 1–7 of the breaker element to the material wall, the order of or pattern is as illustrated in FIG. 18.

With this particular arrangement, it will be realized that in the event a projection such as projection 6 breaks on its application to point A, the next application of said breaker to said point A is through projection 2 which then performs the work required at said point A. Consequently, the breaker element can be effectively used even though somewhat damaged.

It will now be seen that with my device the number and variety of pulverizing patterns is practically unlimited. For instance, if the internal ring gear 110 had 96 teeth and with the sun gear having 16 teeth, and the breaker element was provided with the same number of blades as teeth, the pattern would always by the same. If however, the breaker element was provided with an odd number of blades which were more or less blades than teeth in the sun gear, the pattern would be changed.

I have stated that the included angle defined by the faces of the thread in the breaker element 120 may be 60°. I have found that this angle may be varied and that in the parallel type of breaker, the shape of the teeth may be selected to provide an included angle that causes the material to pack between the teeth and which may pack up to and even beyond the crest of the teeth.

Thus, the packed breaker becomes a breaker made of the same material as the bank. This becomes more effective because with positive pattern disintegration there are inequalities that protrude toward the breaker. At the same time the other breakers would have the teeth shape being such that they would not pack with material.

The included angle of the blades or lands determines whether the device will allow the breaker element to pack or not. If it is found that with an angle of 60° it will pack, then the non-packing elements will have a greater included angle to prevent packing.

Figure 11:
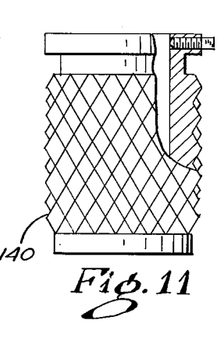
FIG. 11 is a view partly in elevation and partly in section of another form of breaker.

In FIG. 11 I have shown a breaker element the action of which is similar to that just described wherein the surface is provided with a diamond shaped pattern 140.

Figure 12:
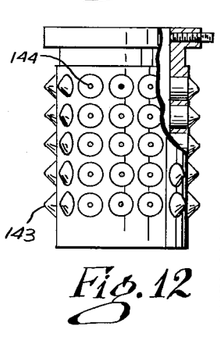
FIG. 12 is a view partly in elevation and partly in section of still another form of breaker.

In FIG. 12 I have shown a breaker element wherein the breaking elements or points comprise a plurality of conical ended studs 143. As shown in the drawings it is not necessary that the elements come to a sharp point. They can be rounded off to provide blunt points 144.

Figure 17:
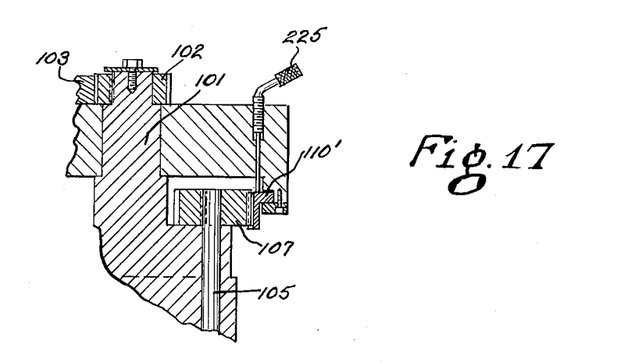
FIG. 17 is a fragmentary section of a modification of driving gear assembly which is designed to compensate for the wear on the breaker elements.

In FIG. 17, I have shown a modified ring gear assembly wherein a threaded lock pin 225 is normally abutting against the top face of the ring gear 110' to prevent the latter from rotating.

This assembly enables the timing between the ring gear and sun gear to be regulated when due to wear of any of the breaking elements the breaking points thereof wipe across the face X of the material rather than appear to be stationary at the instant of contact therewith.

By loosening the lock pin 225, the ring gear 110' may be rotatably adjusted so as to provide the proper rotational timing between the head 100 and each of the breaker elements carried thereon.

Although the internal ring gear 110 is illustrated as being held against rotation by its connection to the main support, it will be apparent that when more than one breaker is used and the spur gears are in mesh with the ring gear that the breakers must revolve in synchronism with each other and that the ring gear could have a floating connection with the support and not be held against revolution. In this case the breaker element in contact with the bank would prevent the other breaker elements from revolving independently through the ring gear and the breaker elements would be brought into contact with the bank in succession and the pattern of disintegration achieved since at least one breaker would always be in contact with the bank.

It will also be apparent that the breaker head with its breaker elements could be mounted upon other devices than that disclosed depending upon the type of material and the place where the device is to be used. For instance, the breaker head could be mounted upon a more simple frame, the advancement of the unit being on wheels, by cable or by driving the wheels. The horizontal slide however and the universal connection for the head provides for a greater versatility.

It should be particularly noted that the breaker blades of FIG. 6 may be rotated 90° to bring the sharp edge to the front, thus allowing four changes to be made without sharpening.

It should be pointed out that the size of the ring gear and sun gears may be varied, i.e. made larger or smaller, without affecting the mode of operation. In some instances, it may be desirable, particularly in shaft mining or kindred operations, to make the ring and sun gears smaller than indicated in the drawings and to maintain the same diameter of the breaker elements, in order that the support for the breaker head does not extend beyond the line of travel of the periphery of the breakers. This will enable the breaker elements to clear a path large enough to enable free operation of the driving mechanism without interference with the bank at the sides. In this case, the head 85 and the supporting yoke 80, as well as the trunions 86, would be positioned inward of the path cleared by the breakers. Such an expedient would be particularly useful when a sweeping action of the head is contemplated as shown by the dot-dash lines in FIG. 1. In this instance a square or rectangular shaft could be broken out of or driven into a bank with ample clearance for the entire machine.

It will be apparent, therefore, that I have provided a device where the hardest material may be broken up with a minimum utilization of power due to the manner in which the power is applied. It will also be apparent that many different materials may be used for the breaker elements since their action is by substantially a compressive force applied directly toward the material rather than by a cutting or a striking of the material as was used in prior art devices. It should also be clear that should wear of the breaker elements occur, they can be reshaped or sharpened which, although resulting in a reduction in size of the individual breaker units, does not change their operation.

Having thus described my invention I am aware that numerous and extensive departures may be made therefrom without departing from the spirit of the invention as defined in the appended claims.

What is claimed is:

1. Apparatus for disintegrating a wall of solid material formed of discrete particles comprising a support rotatably mounting a breaker head on a first axis which, when the apparatus is operable is parallel to the surface of said wall, at least one breaker element rotatably supported on said head on a second axis disposed in parallel spaced relation to said first axis, means for rotating said breaker head in one direction about said first axis effective to carry a peripheral point of said breaker element for engagement with said wall, means for rotating said breaker element about said second axis in a direction opposite to the direction of rotation of said head, means for synchronizing the rotation of said breaker head with said breaker element so that at the instant the peripheral point on said breaker element is carried into engagement with said wall of material the linear velocity of said peripheral point due to the rotation of said breaker element is substantially equal and opposite to the linear velocity of said point due to the rotation of said breaker head, and said peripheral point at the instant of contact with said wall being operable to transmit the force generated by the rotation of said breaker head substantially compressively against said wall and perpendicularly against the surface thereof underlying said point.

2. Apparatus as is defined in claim 1 and wherein a plurality of breaker elements are mounted on said breaker head in radial spaced relation about the rotational center thereof, each being rotatable on an axis disposed in parallel spaced relation to said first axis, means for rotating each of said breaker elements in the direction opposite to the direction of rotation of said breaker head, and the synchronizing means being operable to synchronize the speed of rotation of each breaker element with said breaker head so that at the instant the peripheral point on said breaker element is carried into engageent with the wall of material the linear velocity of said peripheral point due to the rotation of the breaker element is substantially equal and opposite to the linear velocity of said point due to the rotation of said breaker head.

3. In apparatus as is defined in claim 2 and wherein the synchronizing means is effective to provide each breaker element with the same rotational speed.

4. In apparatus as is defined in claim 2 and wherein the synchronizing means is effective to provide at least one of said breaker elements with a different rotational speed as compared to the rotational speed of the other of said breaker elements.

5. A machine for disintegrating material including a support arranged to be moved toward a material being broken, a breaker head rotatably mounted on a first axis on the support, at least one breaker member rotatably carried on a second axis by the head, said first and second axes being in parallel spaced relationship, means to rotate the head in one direction and means carried by the support and connected to the breaker member to rotate the breaker member in the opposite direction to that of the head and at such a speed that at the point of contact with the material the movement of the breaker member laterally relative to the material is substantially zero, said breaker member having peripheral projecting portions thereon, said connecting means between the breaker member and the support applying the force generated by the rotation of said head in a direction on a line in alignment with the axis of the breaker head, the axis of the breaker member and the point of contact of said breaker member, and said projections extending radially outwardly and spaced from the axis of said breaker member such that the distance between the axis of the breaker head and the breaker member axis constitutes a first lever arm and the radial distance from the axis of the breaker member and the end of breaker projections constitutes a second lever arm connected to the first lever arm to provide an effective toggle like linkage.

6. An apparatus of the class described including a support, a breaker head rotatably carried on a first axis by the support, means for driving the breaker head in one direction, breaker members rotatably carried on a second axis by the head with their axes in an orbit spaced from the axis of the head and in parallel relationship thereto and having breaker elements on their peripheries, means carried by the support and connected between the support and the breaker members for causing rotation of the breaker members on the head in a direction opposite to that of the head upon rotation thereof, the relative rotating movement of the breaker members and head being such that lateral movement of the breaker elements relative to the material to be broken is substantially zero, said breaker elements on the breaker members being spaced from the axis thereof, the combined radial distances from the axis of the breaker members to a point of impact of the breaker elements with the material to be broken and from the axis of the breaker head to the axis of each breaker member being greater than the radial distance from the axis of each breaker head to the point of impact of the breaker element with the material to be broken.

7. The machine as defined in and by claim 5 wherein said breaker member is generally cylindrical and the said peripheral projecting portions are projections extending outwardly from the periphery thereof.

8. The machine as defined in and by claim 5 wherein the said breaker member is generally cylindrical and the said peripheral projecting portions are circumferentially disposed projections thereon.

9. The machine as defined in and by claim 5 wherein the said breaker member is generally cylindrical and the said peripheral projecting portions are helically disposed projections thereon.

10. The apparatus as defined in and by claim 6 wherein said breaker members are generally cylindrical and the said breaker elements on the breaker members constitute longitudinally extending projections extending outwardly from the periphery of said breaker members.

11. The apparatus as defined in and by claim 6 wherein said breaker members are generally cylindrical and the said breaker elements on the breaker members constitute circumferentially disposed projections thereon.

12. The apparatus as defined in and by claim 6 wherein said breaker members are generally cylindrical and the said breaker elements on the breaker members constitute helically extending projections thereon.

References Cited by the Examiner
UNITED STATES PATENTS
2,686,047   8/1954   Duncan _____________ 299—22
FOREIGN PATENTS
357,185   8/1922   Germany.

CHARLES E. O'CONNELL, *Primary Examiner.*
BENJAMIN HERSH, *Examiner.*